(12) United States Patent
Kim et al.

(10) Patent No.: US 7,661,868 B2
(45) Date of Patent: Feb. 16, 2010

(54) DIFFUSER SHEET FOR COMPENSATING FOR CHROMATIC DISPERSION AND ILLUMINATION APPARATUS EMPLOYING THE SAME

(75) Inventors: Jin-hwan Kim, Suwon-si (KR); Jin-Seung Choi, Suwon-si (KR); Jee-hong Min, Yongin-si (KR); Jae-ho You, Seoul (KR); Su-mi Lee, Hwaseong-si (KR); Yoon-sun Choi, Incheon-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 326 days.

(21) Appl. No.: 11/389,118

(22) Filed: Mar. 27, 2006

(65) Prior Publication Data

US 2007/0081359 A1     Apr. 12, 2007

(30) Foreign Application Priority Data

Jun. 8, 2005     (KR) ...................... 10-2005-0048860

(51) Int. Cl.
  *F21V 7/04* (2006.01)
(52) U.S. Cl. .................... 362/620; 362/608; 362/355; 362/626; 359/599; 359/454; 359/707
(58) Field of Classification Search ................ 359/599, 359/454–456, 707, 613–614, 619–624, 831, 359/834; 362/608, 97, 620, 627, 223, 311, 362/355, 626, 606 I; 349/62, 64, 67, 95
See application file for complete search history.

(56) References Cited

U.S. PATENT DOCUMENTS 5,587,816 A * 12/1996 Gunjima et al. ............... 349/62
5,673,999 A * 10/1997 Koenck ....................... 362/263
6,011,602 A *  1/2000 Miyashita et al. ............ 349/65
6,020,090 A *  2/2000 Takada et al. .................. 430/1
6,104,446 A *  8/2000 Blankenbecler et al. ........ 349/5
6,435,685 B2 * 8/2002 Matsushita .................. 362/608
6,633,722 B1 * 10/2003 Kohara et al. ............... 385/146
6,733,147 B2 *  5/2004 Wang et al. .................. 362/26
6,788,358 B1 *  9/2004 Kim et al. .................... 349/62
6,879,355 B1 *  4/2005 Kim ............................ 349/65
6,891,530 B2 *  5/2005 Umemoto et al. ........... 345/173
2001/0013976 A1* 8/2001 Hirayama et al. ........... 359/599
2003/0137739 A1* 7/2003 Yoshida et al. .............. 359/599
2003/0147140 A1* 8/2003 Ito ............................. 359/599
2004/0042194 A1* 3/2004 Hsieh .......................... 362/31
2004/0061814 A1* 4/2004 Kim et al. .................... 349/65

FOREIGN PATENT DOCUMENTS

KR      2003-0090406 A      11/2003
KR      10-2004-0103285 A   12/2004
WO      WO 9205535 A1 *     4/1992

* cited by examiner

*Primary Examiner*—Sandra L O'Shea
*Assistant Examiner*—Danielle Allen
(74) *Attorney, Agent, or Firm*—Sughrue Mion, PLLC

(57) ABSTRACT

A diffuser sheet which compensates for chromatic dispersion generated in a hologram light guide plate, and an illumination apparatus employing the diffuser sheet are provided. The diffuser sheet includes a plate type light-transmissive substrate and a light diffusion layer disposed on a light emission surface of the light-emission substrate. A light-incident surface of the light-transmissive substrate has declined surfaces and flat surfaces which are alternatively and repeatedly formed thereon. The declined surfaces are declined at a predetermined angle.

19 Claims, 5 Drawing Sheets

DIFFUSER SHEET FOR COMPENSATING FOR CHROMATIC DISPERSION AND ILLUMINATION APPARATUS EMPLOYING THE SAME

CROSS-REFERENCE TO RELATED PATENT APPLICATION

This application claims priority from Korean Patent Application No. 10-2005-0048860, filed on Jun. 8, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a diffuser sheet and an illumination apparatus, and more particularly, to a diffuser sheet that can compensate for chromatic dispersion generated in a hologram light guide plate, and an illumination apparatus for a display employing the diffuser sheet.

2. Description of the Related Art

Non-emissive displays, such as liquid crystal displays (LCDs), typically require a separate illumination apparatus, such as a backlight unit. FIG. 1 shows an exemplary conventional illumination apparatus for a display provided with a light guide plate using a hologram. Referring to FIG. 1, the conventional illumination apparatus 10 includes a light guide plate 12 having a fine hologram pattern 13 formed on an upper surface thereof, a light source 11 disposed adjacent to one sidewall of the light guide plate 12, and a diffuser sheet 15 which uniformly diffuses the light emitted from the upper surface of the light guide plate 12.

The light source 11 of the illumination apparatus may be, for example, a white light emitting diode (LED). White light emitted from the light source 11 is incident obliquely through one sidewall surface of the light guide plate 12. The light guide plate 12 is made of poly methyl meth Acrylate (PMMA) which is a plastic material with a superior transmittance. The white light within the light guide plate is totally internally reflected by the upper and lower surfaces of the light guide plate. As shown in FIG. 1, since the light guide plate 12 has a hologram pattern 13 formed on the upper surface thereof, some of the light incident on the upper surface of the light guide plate 12 is diffracted by the hologram pattern 13 and is emitted through the upper surface of the light guide plate 12. For example, the hologram pattern 13 may have a sinusoidal form with a predetermined period. The light emitted through the upper surface of the light guide plate 12 is uniformly diffused through the diffuser sheet 15 to illuminate a non-emissive display, such as an LCD.

Refractive indices and transmittance vary depending on the wavelength of the light. Thus, when white light is emitted through the upper surface of the light guide plate 12 and through the hologram pattern 13, chromatic dispersion takes place. FIGS. 2A through 2C illustrate this chromatic dispersion and show measurement results of brightness distributions for red(R), green (G) and blue (B) light emitted from the hologram pattern 13. In the illustrated examples, the hologram pattern 13 has a period of 420 nm and a thickness of 250 nm. Also, the blue light has a wavelength of 600 nm, the green light has a wavelength of 555 nm and the blue light has a wavelength of 450 nm. FIG. 2A illustrates a brightness distribution of red light. As shown in FIG. 2A, most of the red light is distributed near incident center. FIG. 2B illustrates a brightness distribution of green light. As shown in FIG. 2A, the green light is distributed near the incident center, but the brightest portion slightly deviates from the incident center. FIG. 2C illustrates a brightness distribution of blue light. As shown in FIG. 2C, the brightest portion greatly deviates from the incident center. As shown, the brightness distribution is different according to the color of light.

As shown in FIG. 3, chromatic dispersion can be clearly seen from the brightness distributions of red (R), green (G) and blue (B) light. The angles shown in FIG. 3 are value measured with respect to the normal line perpendicular to the light guide plate 12. As shown in FIG. 3, the blue light is distributed centering on the angle of 22°, which is called a peak angle. In other words, the blue light is emitted from the light guide plate 12 at a peak angle of 22°. The green light is emitted from the light guide plate 12 at a peak angle of 8°. The red light is emitted from the light guide plate 12 at a peak angle of 4°.

Thus, the angle of the light emitted from the light guide plate 12 is different depending on wavelength causing the problem that the white light emitted from the light source 11 is divided into respective colors by the light guide plate 12. In the conventional art, the diffuser sheet 15 serves to uniformly diffuse the incident light, but it is limited in its ability to completely reproduce the divided color lights to white light. Therefore, display performance of the display is lowered.

SUMMARY OF THE INVENTION

According to an exemplary aspect of the present invention, there is provided a diffuser sheet which uniformly diffuses incident light. The diffuser sheet includes a plate type light-transmissive substrate and a light diffusion layer disposed on a light emission surface of the light-transmissive substrate. The light-incident surface of the light-transmissive substrate has declined surfaces and flat surfaces alternatively and repeatedly formed thereon. The declined surfaces are declined at a predetermined angle.

The ratios of widths of the declined surfaces to widths of the flat surfaces may vary over the light incident surface.

The light diffusion layer may include a plurality of non-uniformly sized beads.

According to another exemplary aspect of the present invention, there is provided a diffuser sheet which uniformly diffuses light emitted from an upper surface of a light guide plate disposed adjacent to a light source. The diffuser sheet includes a light-incident surface which faces the light guide plate and has declined surfaces and flat surfaces alternatively and repeatedly arranged thereon. The declined and flat surfaces compensate for chromatic dispersion generated when light is emitted through the upper surface of the light guide plate.

The declined surfaces may face the light source.

The ratios of widths of the declined surfaces to widths of the flat surfaces may decrease along the surface of the light incident surface with distance from the light source.

The declined surfaces may be declined at a predetermined angle determined such that the red and blue light incident on the declined surfaces mixes within the diffuser sheet with the red and blue light incident on the flat surfaces.

A light emission surface of the diffuser sheet may include a light diffusion layer having a plurality of non-uniformly sized beads.

The declined surfaces may be recesses in the diffuser sheet.

According to another exemplary aspect of the present invention, there is provided an illumination apparatus including a light source which emits light; a light guide plate having a first sidewall surface disposed adjacent to the light source, and a hologram pattern formed on an upper surface thereof such that the light that is emitted from the light source and is incident into the first sidewall surface is emitted through the upper surface thereof; and a diffuser sheet which uniformly diffuses the light emitted from the upper surface of the light guide plate. A light-incident surface of the diffuser sheet comprises declined surfaces and flat surfaces alternatively and repeatedly formed thereon.

The above illumination apparatus may further include a light reflective plate disposed adjacent to a second sidewall surface opposing the first sidewall surface of the light guide plate. The light reflective plate reflects the light that travels through the light guide plate and is emitted through the second sidewall surface of the light guide plate, toward an inside of the light guide plate.

BRIEF DESCRIPTION OF THE DRAWINGS

The above and other exemplary features and advantages of the present invention will become more apparent from the following detailed description of exemplary embodiments thereof with reference to the attached drawings in which.

DETAILED DESCRIPTION OF EXEMPLARY EMBODIMENTS OF THE INVENTION

Exemplary embodiments of the present invention will now be described more fully with reference to the accompanying drawings.

Figure 1:
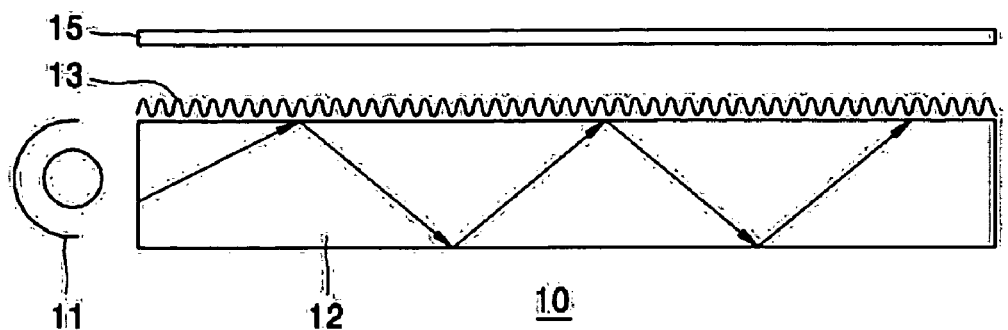
FIG. 1 is a schematic sectional view of a conventional illumination apparatus for a display provided with a hologram light guide plate.
Figure 2A:
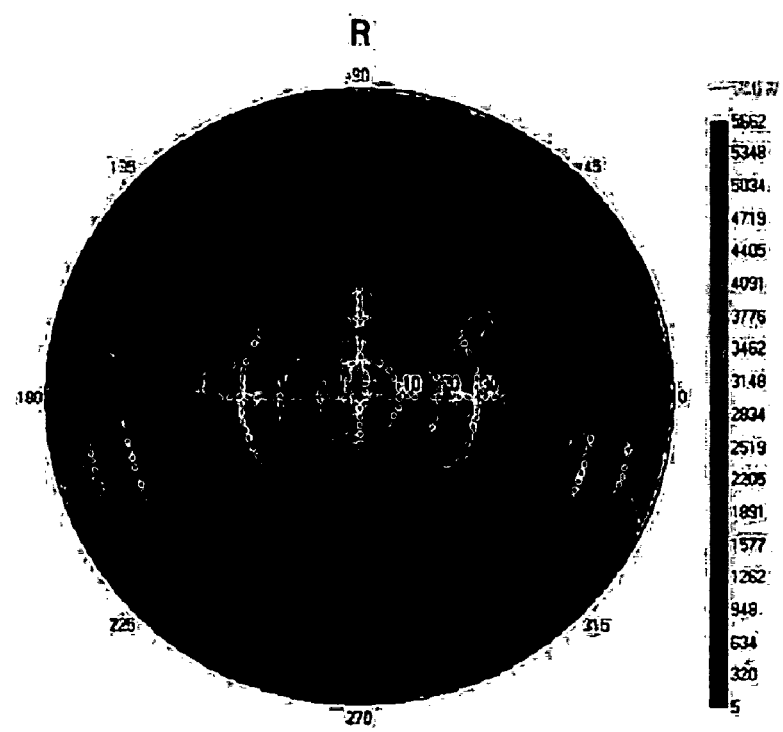
FIGS. 2A through 2C show measurement results of brightness distributions for red(R), green (G) and blue (B) light emitted from a hologram pattern.
Figure 2B:
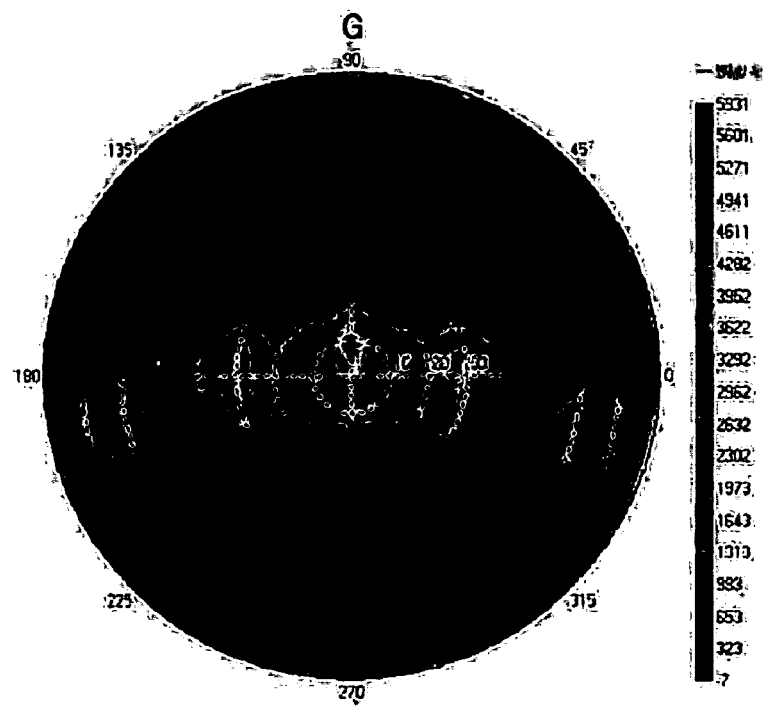
Figure 2C:
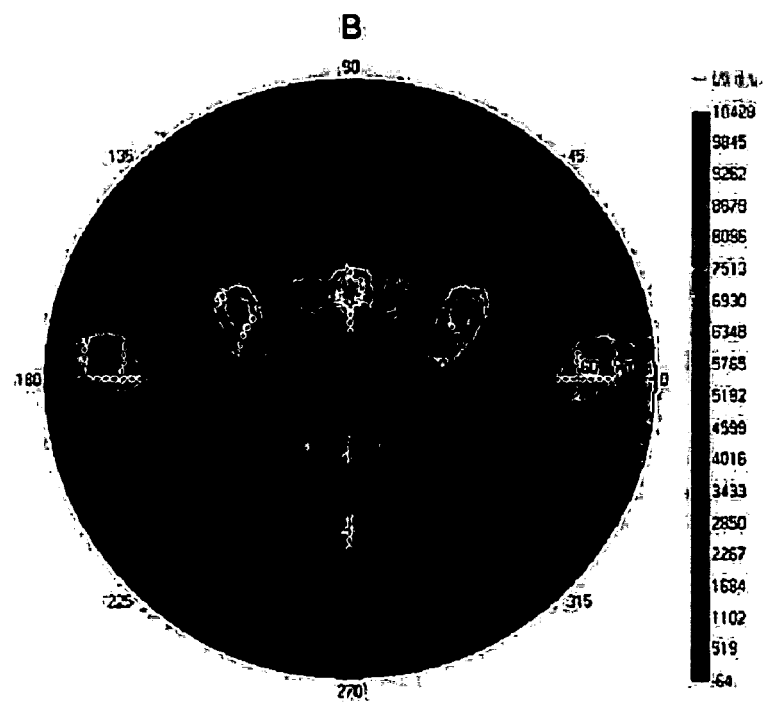
Figure 3:
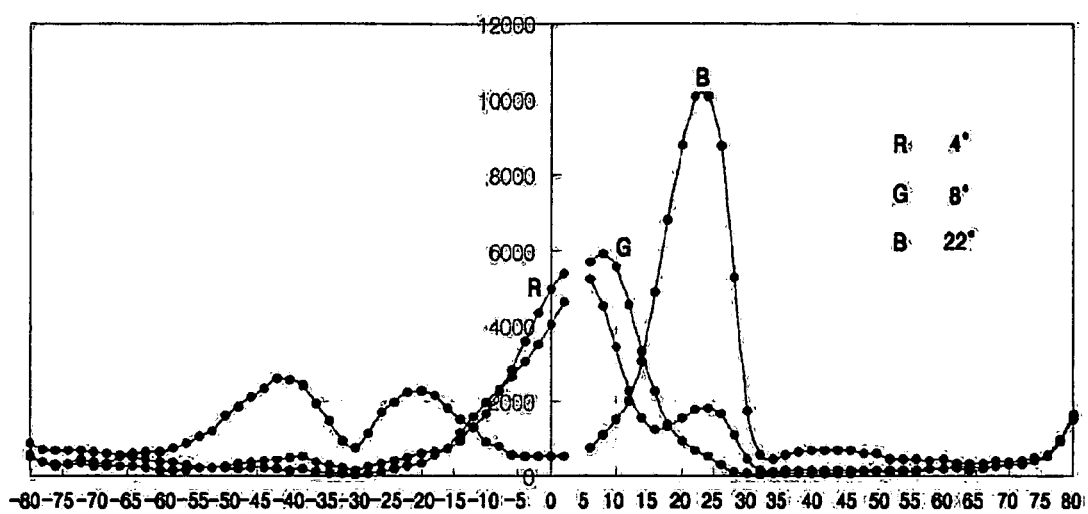
FIG. 3 is a graph showing brightness distributions depending on emission angles of red(R), green (G) and blue (B) light.
Figure 4:
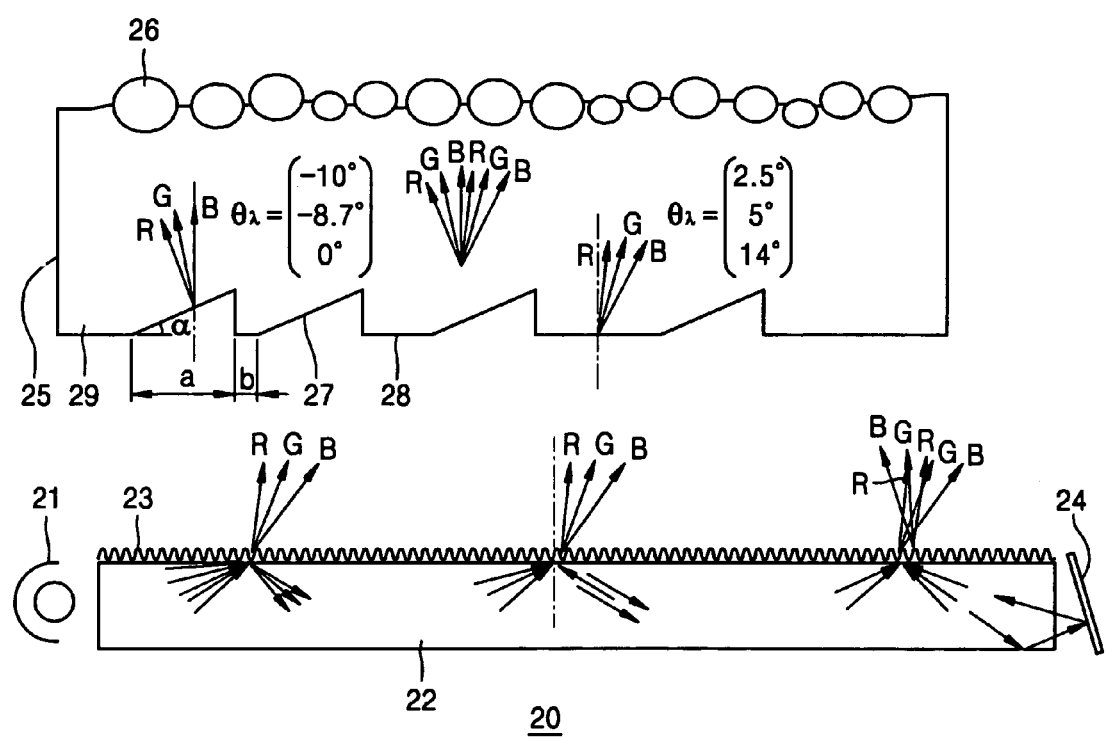
FIG. 4 is a schematic sectional view of an illumination apparatus for a display employing a diffuser sheet according to an exemplary embodiment of the present invention.

FIG. 4 is a schematic sectional view of an illumination apparatus for a display employing a diffuser sheet according to an exemplary embodiment of the present invention. Referring to FIG. 4, the illumination apparatus of the present invention includes a light source 21 which emits light; a light guide plate 22 having a first sidewall surface disposed adjacent to the light source 21, and a hologram pattern 23 formed on an upper surface thereof; and a diffuser sheet 25 which uniformly diffuses the light emitted from the upper surface of the light guide plate 22.

In an exemplary embodiment of the present invention, the light source 21 may include, for example, a light emitting diode (LED) which emits white light. Although FIG. 4 shows an example of only one light source, a plurality of light sources may be arranged along the first sidewall surface of the light guide plate 22.

The light guide plate 22 can be formed of poly methyl meth acrylate (PMMA) which is a plastic material having a superior transmittance. Also, the hologram pattern 23 can have a sinusoidal form with a predetermined period. For example, the hologram pattern 23 has a sinusoidal form with a period of 420 nm and a thickness of 250 nm. In the above structure, the light emitted from the light source 21 is incident obliquely into light guide plate 22 through the first sidewall surface of the light guide plate 22, and is then diffracted by the hologram pattern 23 and emitted to the outside of the light guide plate 22 through the upper surface of the light guide plate 22.

A light reflective plate 24 may be additionally disposed adjacent to a second sidewall surface of the light guide plate opposite to the first sidewall surface. The light reflective plate 24 reflects the light that travels inside the light guide plate 22 and is emitted through the second sidewall surface of the light guide plate 22. The light reflected by the light reflective plate 24 is again incident into the inside of the light guide plate through the second sidewall surface of the light guide plate 22, is diffracted by the hologram pattern 23 and is emitted to the outside through the upper surface of the light guide plate 22.

The diffuser sheet 25 is disposed on the light guide plate 22 so that it uniformly diffuses the light emitted from the upper surface of the light guide plate 22. The diffuser sheet 25 has a light diffusion layer 26, for uniformly diffusing light, disposed on an upper surface of a plate type light-transmissive substrate. The light-transmissive substrate may be formed of synthetic resin, such as acryl or polycarbonate (PC). The diffuser sheet 26 can include a plurality of beads that are non-uniform in size, as shown in FIG. 4. The beads may have a diameter ranging from about 10 μm to 80 μm, and an average diameter of about 50 μm. While passing through a layer 26 of the beads having a variety of diameters, the light can be uniformly diffused. Also, by adding a diffuser agent or air bubble to an inside of the light-transmissive substrate 29 formed of polycarbonate, acryl or the like, it is possible to allow the light-transmissive substrate by itself to cause light diffusion.

The diffuser sheet 25 according to an exemplary embodiment of the present invention has a structure in which a light-incident surface of the diffuser sheet 25 includes declined surfaces 27, declined at an oblique angle, and flat surfaces 28 so as to compensate for chromatic dispersion generated when light is emitted through the upper surface of the light guide plate 22. In FIG. 4, while the diffuser sheet 25 is drawn much thicker than the light guide plate 22, in order to show the declined surfaces 27 and the flat surfaces 28 in more detail, the diffuser sheet 25 may actually have a thickness of about 150 μm. As shown in FIG. 4, the plurality of declined surfaces 27 and the plurality of flat surfaces 28 are alternatively and repeatedly formed.

Figure 5:
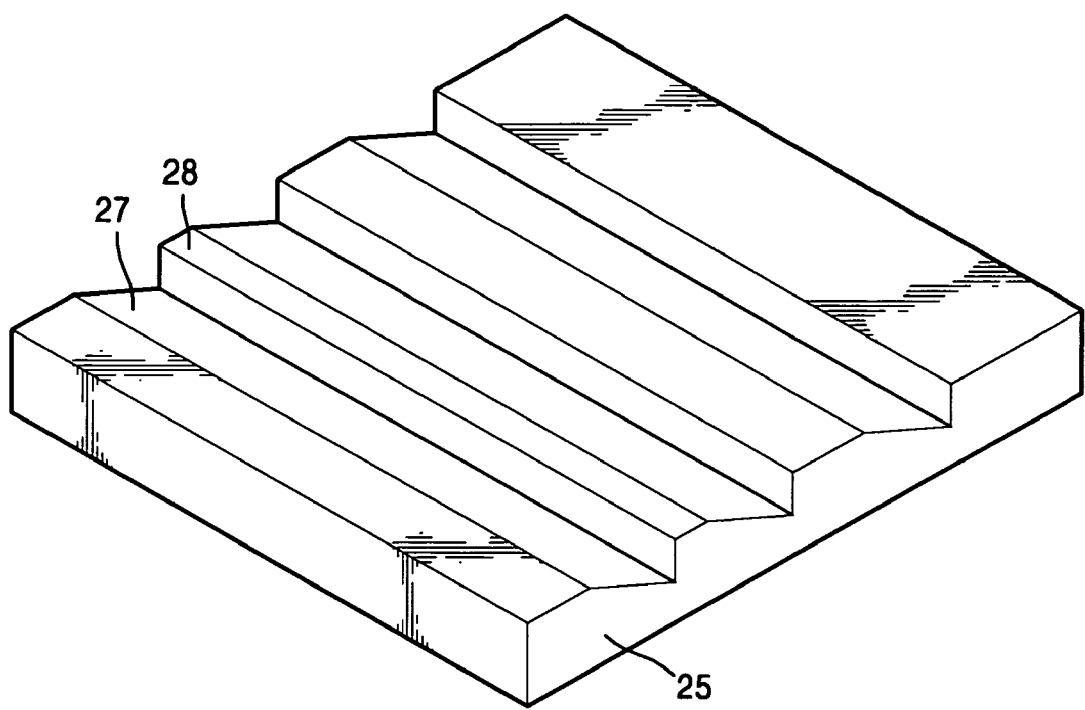
FIG. 5 is a perspective view of a light-incident surface structure of a diffuser sheet according to an exemplary embodiment of the present invention.

FIG. 5 is a perspective view of a light-incident surface structure of a diffuser sheet according to an exemplary embodiment of the present invention. Referring to FIG. 5, the plurality of declined surfaces 27 and the plurality of flat surfaces 28 are alternatively and repeatedly arranged in parallel with each other. The declined surfaces 27 can be constituted, for example, by forming a recess declined toward an inside of the diffuser sheet 25 in the light-incident surface of the flat diffuser sheet. According to an exemplary embodiment of the present invention, the plurality of declined surfaces 27 are directed toward the same direction, preferably, toward the same direction as the light source 21 as shown in FIG. 4. That is, the plurality of declined surfaces 27 may be formed in a direction such that the light emitted from the light source 21 travels inside the light guide plate 22.

Principles for compensating for chromatic dispersion in the above diffuser sheet 25 according to an exemplary embodiment of the present invention will now be described.

According to one example, it is assumed that red (R) light has a wavelength of 600 nm, green (G) light has a wavelength of 555 nm, and blue (B) light has a wavelength of 450 nm, and that the hologram pattern 23 has a period of 420 nm and a thickness of 250 nm. Then, the red (R) light is emitted at a peak angle of about 4° from the light guide plate 22. The green (G) light is emitted at a peak angle of about 8° from the light guide plate 22, and the blue (B) light is emitted at a peak angle of about 22° from the light guide plate 22. That is, as indicated by arrows in FIG. 4, light is emitted at angles approaching a vertical direction as the wavelength of the emitted light increases, and light is emitted at angles going away from a vertical direction as the wavelength of the emitted light decreases. Thus, since the red (R), green (G) and blue (B) lights are diffracted by the hologram pattern 23 and thus are emitted at different peak angles depending on wavelengths, chromatic dispersion takes place.

Some of the chromatically dispersed light is incident into the diffuser sheet 25 through the declined surfaces 27 and some is incident into the diffuser sheet 25 through the flat surfaces 28. When light passes through a boundary between two media having different refractive indices, the light is refracted at the boundary according to Snell's law. Since the incident angle of the light through the declined surfaces is different from that of the light through the flat surfaces, the peak angles in the diffuser sheet 25 are different.

For example, when the illumination apparatus is designed such that the light-transmissive substrate 29 is formed of polycarbonate having a refractive index 'n' of 1.58, and a declined angle 'α' of the declined surfaces 27 is 30°, the red (R) light incident through the flat surfaces 28 has a peak angle of about 2.5°, the green (G) light has a peak angle of about 5°, and the blue (B) light has a peak angle of about 14°. Also, the red (R) light incident through the declined surfaces 27 has a peak angle of about −10°, the green (G) light has a peak angle of about −8.7°, and the blue (B) light has a peak angle of about 0°. In other words, in the case of light that passes through the declined surfaces 27, the blue (B) light, having a relatively short wavelength, travels at an angle approaching a vertical direction, whereas the light having a relatively long wavelength travels at an angle going away from the vertical direction. Meanwhile, in the case of light that passes through the flat surfaces 28, the red (R) light having a relatively long wavelength travels at an angle approaching a vertical direction, whilst the light having a relatively short wavelength travels at an angle going away from the vertical direction. Accordingly, as indicated by a group of arrows positioned at a center portion of the diffuser sheet 25 shown in FIG. 4, the red, green, and blue light form almost symmetric peak angles within the diffuser sheet 25. As a result, the chromatically dispersed light can be mixed and converted into an almost white light.

Also, while the light traveling at a peak angle of about ±10° within the diffuser sheet 25 passes through the light diffusion layer 26 including the beads, most of the light is emitted at an angle approaching the vertical direction with respect to the diffuser sheet 25. In the above example, since most of the light has a peak angle within ±10°, the light is mostly emitted in a vertical direction while passing through the light diffusion layer 26, and is mixed and converted into a more complete white light. In particular, according to an exemplary embodiment of the present invention, since the red (R) light, having a long wavelength, is almost symmetric to the blue (B) light, having a short wavelength, they are mixed while emitted from the light diffusion layer 26, thus almost compensating for chromatic dispersion. Accordingly, chromaticity can be improved compared with the conventional art. Also, since the green (G) light, having peak angles of −8.7° and 5°, is mixed while passing through the light diffusion layer 26 including the beads, the brightness can be improved.

According to an exemplary embodiment of the present invention, by adjusting a ratio (a/b) of width 'a' of the declined surfaces 27 to width 'b' of the flat surfaces 28, the color mixing ratio can be adjusted to an optimum value. In other words, when the diffuser sheet 25 is designed, by considering a distribution of peak angles according to wavelengths of light emitted from the light guide plate 22, the declined angle 'α' of the declined surfaces 27, the ratio 'a/b' of the width 'a' of the declined surfaces to the width 'b' of the flat surfaces 28, etc., can be selected optimally.

Especially, where the light reflective plate 24 is additionally disposed adjacent to a sidewall surface of the light guide plate 22, the diffuser sheet 25 may be designed such that the ratio 'a/b' decreases as it goes away from the light source 21. This is because, in the case of the light that is reflected by the light reflective plate 24 and is then again incident into the light guide plate 22, the peak angles at each wavelength when the light emitted through the upper surface of the light guide plate 22 are opposite to those in the previous description, and thus the chromatic dispersion gradually decreases as it travels away from the light source.

As described above, the diffuser sheet according to an exemplary embodiment of the present invention can more completely compensate for the chromatic dispersion caused in a light guide plate having a hologram pattern. Accordingly, when the diffuser sheet according to the present invention is used in an illumination apparatus for a display, chromatic dispersion is minimized, so that more superior chromaticity and brightness can be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A diffuser sheet for uniformly diffusing incident light, comprising:
    a plate type light-transmissive substrate; and
    a light diffusion layer directly disposed on a light emission surface of the light-transmissive substrate,
    wherein a light-incident surface of the light-transmissive substrate has declined surfaces and flat surfaces which are alternatively and repeatedly formed; and
    wherein the flat surfaces are all in the same plane, and the declined surfaces form asymmetric triangles having a first side longer than a second side;
    wherein the light emission surface and the light incident surface are disposed on opposite sides.

2. The diffuser sheet of claim 1, wherein the ratios of widths of the declined surfaces to widths of the flat surfaces vary over the light incident surface.

3. The diffuser sheet of claim 1, wherein the light diffusion layer comprises a plurality of non-uniformly sized beads.

4. A diffuser sheet for uniformly diffusing light emitting from an upper surface of a light guide plate disposed adjacent to a light source, comprising:
    a light-incident surface facing the light guide plate and having declined surfaces and flat surfaces alternatively and repeatedly arranged which compensate for chromatic dispersion generated when light is emitted through the upper surface of the light guide plate; and
    a light emission surface on which a light diffusion layer is directly disposed;
    wherein the flat surfaces are all in the same plane, and the declined surfaces form asymmetric triangles having a first side longer than a second side; and
    wherein the light emission surface and the light incident surface are disposed on opposite sides.

5. The diffuser sheet of claim 4, wherein, for each asymmetric triangle, the first side is closer to a sidewall surface of the light guide plate on which light is incident than the second surface.

6. The diffuser sheet of claim 5, wherein the ratios of widths of the declined surfaces to widths of the flat surfaces decrease along the surface of the light incident surface with distance from the sidewall surface of the light guide plate on which light is incident.

7. The diffuser sheet of claim 5, wherein the first surfaces of the asymmetric triangles are declined at a predetermined angle and the predetermined angle is determined such that red and blue light incident on the declined surfaces mixes within the diffuser sheet with red and blue light incident on the flat surfaces.

8. The diffuser sheet of claim 5, wherein the light emission surface of the diffuser sheet comprises the light diffusion layer having a plurality of non-uniformly sized beads.

9. The diffuser sheet of claim 5, wherein the asymmetric triangles are recesses in the diffuser sheet.

10. An illumination apparatus comprising:
a light source which emits light;
a light guide plate having a first sidewall surface disposed adjacent to the light source, and a hologram pattern formed on an upper surface thereof such that the light emitted from the light source and then incident into the first sidewall surface is emitted through the upper surface thereof; and
a diffuser sheet which uniformly diffuses light emitted from the upper surface of the light guide plate,
wherein a light-incident surface of the diffuser sheet comprises declined surfaces and flat surfaces which are alternatively and repeatedly formed so as to compensate for chromatic dispersion caused by the hologram pattern;
wherein the declined surfaces are all in the same plane, and the declined surfaces form asymmetric triangles having a first side longer than a second side;
wherein the light-incident surface of the diffuser sheet faces the upper surface of the light guide plate; and
wherein the diffuser sheet comprises:
a light emission surface disposed on a side opposite the light-incident surface, and
a light diffusion layer which is directly disposed on the light emission surface.

11. The illumination apparatus of claim 10, wherein, for each asymmetric triangle, the first side is colder to the first sidewall surface of the light guide plate than the second side.

12. The illumination apparatus of claim 11, wherein the ratios of widths of the declined surfaces to widths of the flat surfaces decrease along the surface of the light incident surface with distance from the first sidewall surface of the light guide.

13. The illumination apparatus of claim 11, wherein the first sides of the asymmetric triangles are declined at a predetermined angle which is determined such that a red and a blue light incident on the declined surfaces mixes within the diffuser sheet with a red and blue light incident on the flat surfaces.

14. The illumination apparatus of claim 11, wherein the light emission surface of the diffuser sheet comprises the light diffusion layer having a plurality of non-uniformly sized beads.

15. The illumination apparatus of claim 11, wherein the light source is a white light LED.

16. The illumination apparatus of claim 11, further comprising a light reflective plate disposed adjacent to a second sidewall surface opposing the first sidewall surface of the light guide plate; wherein the light reflective plate reflects light emitted from the second sidewall surface of the light guide plate, back toward the second sidewall surface of the light guide plate.

17. The illumination apparatus of claim 11, wherein the asymmetric triangles are recesses in the diffuser sheet.

18. A diffuser sheet, comprising:
a substantially planar light-transmissive substrate having a light emission surface and a light incident surface;
a light diffusion layer directly disposed on the light emission surface of the substrate;
wherein the light incident surface comprises a plurality of declined surfaces and flat surfaces, where the declined surfaces and the flat surfaces are arranged alternately;
wherein the flat surfaces are all in the same plant, and the declined surfaces form asymmetric triangles having a first side longer than a second side; and
wherein the light emission surface and the light incident surface are disposed on opposite sides.

19. An illumination apparatus, comprising:
a light source;
a light guide plate comprising a sidewall adjacent to the light source and an upper surface having a hologram pattern formed thereon; and
a diffuser sheet having a light incident surface disposed adjacent to the upper surface of the light guide plate;
wherein the light incident surface of the diffuser sheet comprises a plurality of declined surfaces and flat surfaces, where the declined surfaces and the flat surfaces are arranged alternately;
wherein the flat surfaces are all in the same plane, and the declined surfaces form asymmetric triangles having a first side longer than a second side;
wherein the light-incident surface of the diffuser sheet faces the upper surface of the light guide plate; and
wherein the diffuser sheer comprises:
a light emission surface disposed on a side opposite the light-incident surface, and
a light diffusion layer which is directly disposed on the light emission surface.

* * * * *